March 15, 1966
W. H. CONANT ETAL
3,240,276
ROOT CROP HARVESTING AND PROCESSING MACHINE
Filed Feb. 1, 1963
2 Sheets-Sheet 1
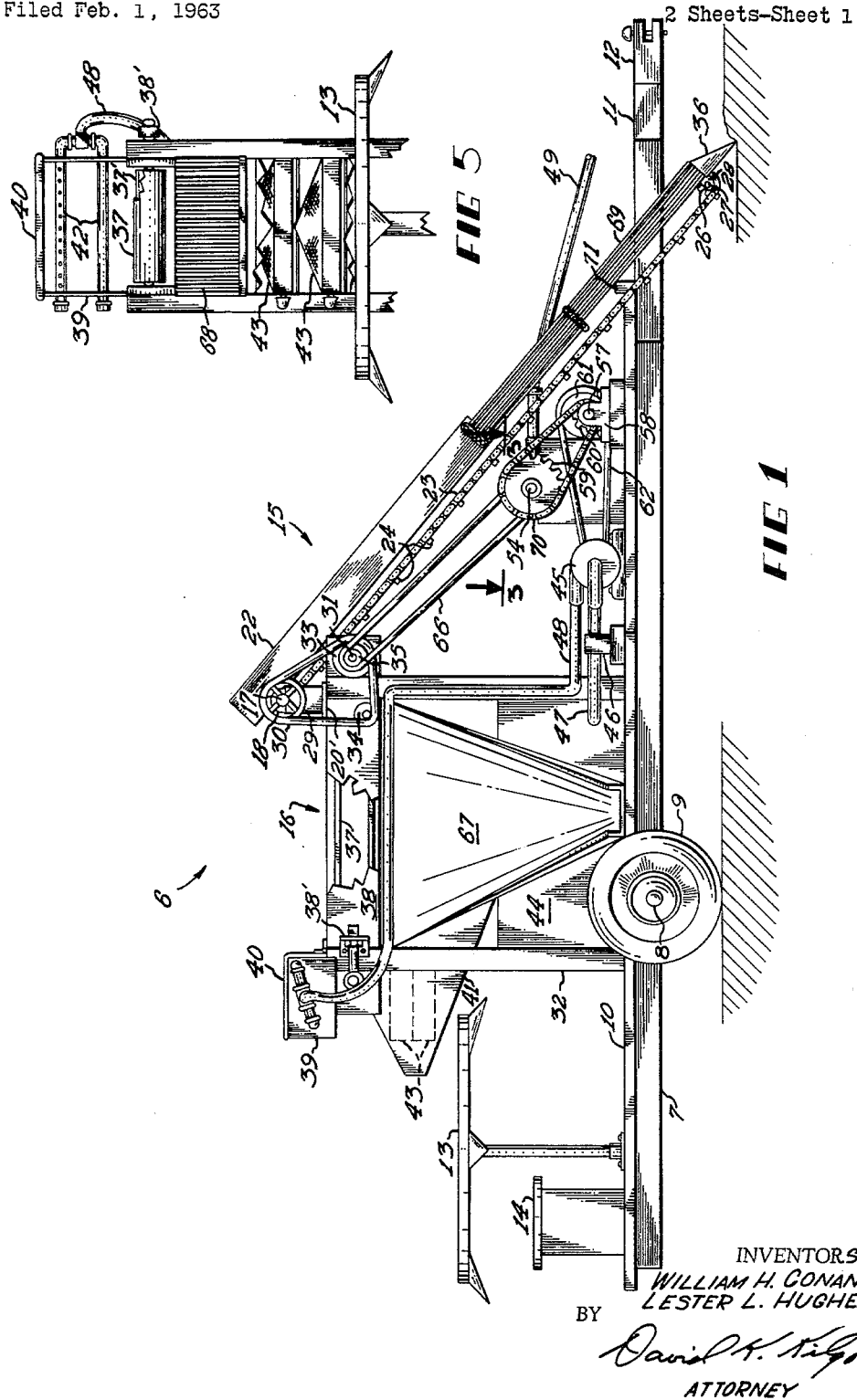
INVENTORS
WILLIAM H. CONANT,
LESTER L. HUGHES
BY
David K. Kilgore
ATTORNEY March 15, 1966     W. H. CONANT ETAL     3,240,276
ROOT CROP HARVESTING AND PROCESSING MACHINE
Filed Feb. 1, 1963     2 Sheets-Sheet 2
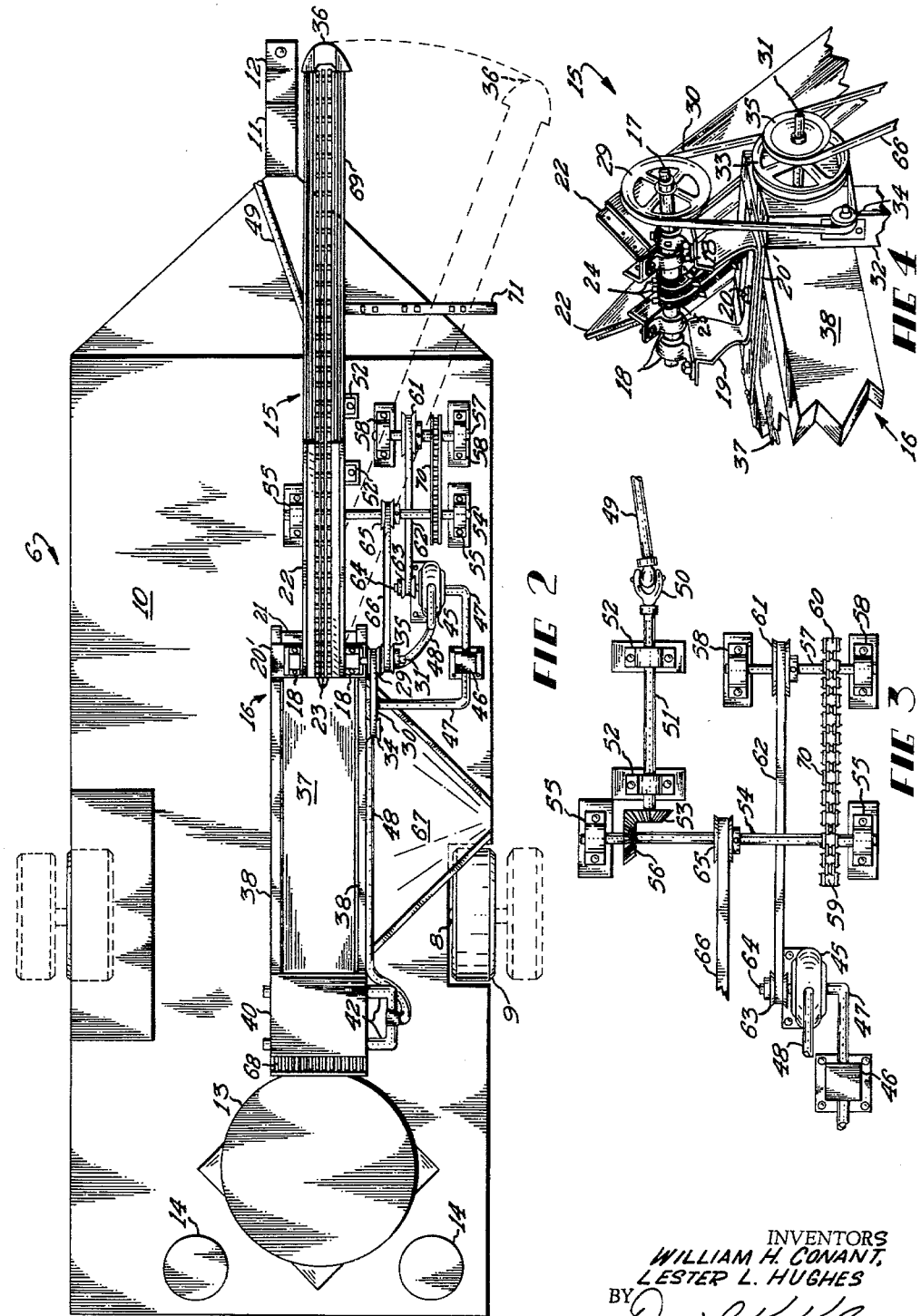
INVENTORS
WILLIAM H. CONANT,
LESTER L. HUGHES
BY
ATTORNEY > # United States Patent Office > 3,240,276
> Patented Mar. 15, 1966

3,240,276
ROOT CROP HARVESTING AND PROCESSING
MACHINE
William H. Conant, 8004 36th Ave., Minneapolis, Minn.,
and Lester L. Hughes, Rte. 4, Anoka, Minn.
Filed Feb. 1, 1963, Ser. No. 255,616
2 Claims. (Cl. 171—17)

This invention relates broadly to a machine for harvesting and processing root crops, more particularly to a machine for harvesting and processing radishes, and more specifically to a machine of the class described wherein the entire device is mounted on a towed vehicle having a riding platform for the operator thereof.

The principal object of this invention is to provide a unitary radish and other small root crop harvester and washer that is mounted on a trailed vehicle having an operating platform and which is generally powered by the power take-off means associated with the towing vehicle.

A further object of this invention is to provide a radish and other small root crop harvester that is entirely self-contained except for its power source.

A still further object of this invention is to provide a radish and other small root crop harvester that is relatively simple to operate certain parts thereof being automatic in operation and which is also relatively simple and comparatively inexpensive to manufacture.

These and other objects of the invention will become apparent from the following specification and claims when taken in conjunction with the appended drawings which form a part of this application, and in which drawings, like characters indicate like parts throughout the several views.

To the above end, generally stated, the invention consists of the following devices and combination of devices hereinafter described and defined in the claims.

Referring to the drawings—

FIG. 1 is a side elevational view of the invention.

FIG. 2 is a top plan view of the same.

FIG. 3 is an enlarged fragmentary view showing the driving mechanism and power take-off means.

FIG. 4 is a perspective view showing the upper driving connections of the discharge end of an elevating conveyor.

FIG. 5 is a view showing the crop washing apparatus.

The numeral 6 will hereinafter refer to the device as an entirety comprising broadly, a trailer type vehicle having a frame 7 mounted on an axle 8, and a pair of opposed ground wheels 9, adjustably mounted on the said axle 8, as seen in FIG. 2. A bed 10 which serves as a means for mounting the invention proper and also as a riding platform for the operator of the device, is securely mounted on the frame 7. A tongue 11 having clevis 12, is rigidly secured to the frame 7 and is provided to afford a connection with the draw-bar of the towing vehicle, not shown. The front of the frame 7 is thereby supported by the towing vehicle. A sorting and bagging table 13, is mounted on the rear end portion of the bed 10 and stools 14 for operators working at the sorting and bagging table are indicated by the numeral 14.

The digging apparatus comprises a conveyor boom 15 adjustably mounted on the frame 7 and the bed 10, said boom 15 being upwardly inclined from its forward end portion and constructed and arranged to extend, in its outer reaches, over the bed 10 and into engagement with the ground and the root crops therein being harvested.

A substantially rectangular upright frame 16 is centrally mounted on the bed 10 and provides a mounting station for the inner and upper end portion of the conveyor boom 15. At said inner and upper end portion the boom 15 is pivotally mounted for vertical adjustment and swinging movements on a chain drive shaft 17 that is journaled in bearings 18 that are mounted on the respective upstanding legs of a U shaped bracket 19 that is mounted on the frame 16 for pivotal movements about the horizontal axis of the shaft 17. As shown, the lower portion of boom 15 is supported on bar 71. A heavy nut-equipped bolt 20 extends through a bore in the mounting plate 20' of the bracket 19 and an upper cross-tie member 21 of the upright frame 16 thus affording pivotal mounting of the said bracket 19 on the frame 16 to provide for lateral swinging movements of the conveyor boom 15. Lateral swinging of the boom 15 to the dotted line position of FIG. 2, while still being supported on bar 71, causes the lower end of the boom to be supported high enough for highway travel.

The said conveyor boom 15, through its upper end portion, is generally in the shape of a V trough having solid and upwardly and outwardly inclined side members 22. It is important to note that the side portions 69 of the lower end portion of the conveyor boom 15 are open. Loose dirt dug with radishes may fall through the lower side portions 69 to the ground.

The conveyor boom 15 is provided with a plurality of endless driven conveyor link chains 23 having a plurality of longitudinally spaced cleats 24 secured thereto.

The endless conveyor chains 23 are constructed and arranged to run between a plurality of driven sprocket wheels 25 secured in transversely spaced relation on the shaft 17 which pivotally mounts the conveyor boom 15 on the upright frame 16, and idler sprocket wheels 26 mounted on an idler shaft 27 that is mounted in bearings 28 secured to the underside of the lower or outer end portion of the conveyor boom 15 substantially at the transverse center thereof. While not shown on the drawing it will be understood that suitable conventional means will be provided for adjustment of the said conveyor chains 23. Such adjustment may allow more sag in the bottom run of chains 23 to facilitate upward swinging adjustment of the boom 15 about the shaft 17.

These endless conveyor chains are driven by means of the sprocket wheels 25 mounted on the shaft 17, said shaft having mounted on one outer end portion thereof a V pulley 29 that is driven by a V belt 30 and is powered by the power take-off means of the towing vehicle as will hereinafter be explained more in detail. The belt 30 will permit limited movement of pulley 29 to accommodate lateral swinging of the boom as seen in FIG. 2; and if necessary, the belt can be removed to permit maximum lateral swinging.

A conveyor drive shaft 31 is journaled in bearing blocks, not shown, that are mounted at each upper end portion respectively of a pair of forward, laterally spaced upright members 32 of the upright frame 16. A V pulley 33 is secured to the conveyor drive shaft 31 in vertical alignment with the V pulley 29 and the V belt 30 runs over the V pulleys 29 and 33 and thence over a small idler V pulley 34 mounted on the said forward upright frame members 32 to afford means for adjusting the V belt 30.

A second V pulley 35 is secured on the conveyor drive shaft 31 and provides the main driven pulley of the conveyor drive as will presently appear.

As heretofor stated, the conveyor boom 15 is pivotally mounted on the upright frame for both lateral and vertical swinging movements and is provided with conventional means on positioning bar 71 for locking the same in a pre-determined position. The forward and lower end portion of the boom 15 is provided with a shovel point 36 positioned for ground engagement and constructed and arranged to dig and discharge the root crop, such as radishes, being harvested onto the elevating conveyor link chains 23 which are carried by the conveyor boom 15. A substantial portion of the dirt dug with the radishes falls back to ground through the open lower side portions 69 of the boom.

The upper or discharge end portion of the conveyor assembly is positioned substantially over the forward end portion of a horizontal secondary conveyor 37 of the belt type that is in communication at its rear end portion with spraying and washing apparatus that will be presently explained more in detail.

The said secondary belt conveyor 37 has a broad flat top surface which is substantially broader than the elevating conveyor chains 23. The conveyor 37 is constructed and arranged to run over a forward drum-type pulley, not shown and a rear drum-type pulley 37', the said forward drum-type pulley being mounted on the conveyor drive shaft 31 and driven thereby. The rear drum-type pulley 37' carrying the belt type conveyor 37 is mounted on a shaft journaled in bearings, not shown, mounted on the rear end portion of upper side members 38 of the upright frame 16 and is provided with conventional belt adjusting means 38'. The belt conveyor 37 cooperates with the elevating conveyor chains 23 to receive the root crop or radishes therefrom and permit the radishes to spread for inspection and removal of debris and damaged crop. As the radishes travel rearwardly along the belt 37, the person, standing on the bed 10 adjacent the side member 38, will pick over the radishes, and remove debris, damaged radishes, etc.

The said crop washing apparatus comprises a housing 39 having a cover member 40 and a bottom portion in the form of a draining rack 41 and a pair of spray heads 42 connected to a water pressure system as will presently appear. A plurality of removable cleaning screens 43 are provided and positioned adjacent the drain rack 41 and a debris discharge chute 67 having communication at its lower end portion with one side portion of the bed 10 and extends substantially at its upper end portion along the greater part of one side of the secondary conveyor 37.

It will be understood that as the radishes are discharged off conveyor 37, the radishes are drenched with a cleansing spray as they tumble and roll downwardly along inclined bars 68. Dirt and debris fall between bars 68 with the water and onto the cleaning screens 43 which removes the debris and dirt from the water. From bars 68 the root crop being harvested is discharged onto the sorting and bagging table 13.

A self-contained water system under pressure reuses much of its original water supply by the embodiment of filters, comprises a water storage tank 44, a pump 45, and a filter 46. A water line 47 leads from the water storage tank 44 to the pump 45 and a further water line 48 leads from the pump 45 to the spray heads 42 in the housing 39, and the filter 46 is interposed in the water line 47 connecting the water storage tank 44 with the pump 45.

Referring now specifically to FIG. 3 of the drawing which illustrates the driving connections wherein the numeral 49 indicates a fragmentary portion of the power take-off shaft of the towing vehicle, not shown, and a universal joint 50 is fitted to the inner end portion of the said power take-off shaft 49.

A longitudinally disposed drive shaft 51, journaled in bearing blocks 52 mounted on the bed 10 said shaft 51 having bevel gear 53 fitted to its inner end portion. A transversely disposed drive shaft 54 is journaled in bearing blocks 55 that are also mounted on the bed 10 and a bevel gear 56 is fitted to the said drive shaft 54 and is in meshing engagement with the bevel gear 53 on the drive shaft 51.

A still further, relatively short, transversely disposed drive shaft 57 is journaled in bearing blocks 58 also mounted on the bed 10. Sprocket wheels 59 and 60 respectively are mounted on drive shafts 54 and 57 and an endless chain 70 is constructed and arranged to run over said sprocket wheels 59 and 60 to provide the driving connection between said shafts 54 and 57. A V pulley mounted substantially at the transverse center of the drive 57 is provided to carry a V belt 62 that runs over a V pulley 63 mounted on the drive shaft 64 of the pump 45, said pump also being mounted on the bed 10.

A V pulley 65 substantially transversely centered on the shaft 54 carries a V belt 66 that is arranged to run over V pulley 35 mounted on the outer end portion of the conveyor drive shaft 31 and thus afford means for powering the elevating chain conveyor assembly 23 and the secondary belt type conveyor 37.

As the machine is drawn along through the field by a tractor to which the clevis 12 is attached, the draw bar on the tractor will support the front end of the frame and will cause the upwardly and rearwardly inclined digging shovel 36 to be disposed at the proper location with respect to the row crop being harvested and with respect to the ground. The frame will be drawn directly along a crop row, the radishes in which are to be harvested, and the shovel 36 will be continuously urged downwardly by dirt passing upwardly thereover and will dig sufficiently deep as to uplift the radishes in the crop row and deposit the radishes, together with the dirt dug up with the radishes onto the conveyor 23 with the conveying flight 24 thereon. As the radishes travel upwardly along the lower portion of the boom, a substantial portion of the dirt and debris will fall back to the ground through the open side portion 69. The harvested radishes will be carried up to the upper end of the boom and they will thereupon fall onto the conveyor belt 37 and by bouncing and rolling will spread out and avoid piling up on the belt 37 which moves the radishes rearwardly therealong. It will be noted that because of the broad horizontal nature of the table 37, the radishes will spread out over a wide area with a minimum of piling up so as to allow inspection of these radishes. Undersized radishes and chunks of dirt and other debris will be picked off the belt 37 so that as the radishes reach the rear end of the belt 37, the only remaining radishes thereon are those which are suitable for market.

As the raishes fall off the rear end of the belt 37, the radishes are immediately drenched with a cleansing spray of water from the spray heads 42 and the radishes roll downwardly along the inclined bars 68 and ultimately tumble onto the table 13. The water and dirt from the cleaning operation passes downwardly between the bars 68 and the water will go through the screens 43 and the dirt will be collected thereon and discharged to the side.

Of course the water will be recirculated to the tank and pumped back to the spray head. In the tank, any remaining dirt in the water is allowed to settle out and the tank may be cleaned from time to time to remove this dirt.

It is to be particularly noted that the drenching spray of water is applied to these radishes in the cleansing operation immediately after the radishes have been harvested from the ground so that the moisture from the ground is still in the dirt and chunks of debris which clings to the radishes so that this dirt and debris is readily and easily removed from the radishes during this cleansing operation. Because of the close proximity of location and time between the harvesting of the radishes and the washing thereof, a very high degree of cleansing can be obtained through a minimum of effort.

While there are herein disclosed but a limited number of embodiments of the structure, process and product of the invention herein presented, it is possible to produce still other embodiments without departing from the inventive concept herein disclosed, and it is desired, therefor, that only such limitations be imposed on the appended claims as are stated herein are required by the prior art.

What we claim is:

1. A root crop harvesting and processing machine comprising in a combination a frame, means supporting the frame and including ground wheels journaled on the frame, an upwardly and rearwardly inclined boom on the frame and having a lower forward end portion with ground enegaging means thereon and harvesting root crop by digging and removing such root crop from the ground, an elevating conveyor on said boom and receiving and carrying the root crop and dirt upwardly and rearwardly along the boom, a substantially horizontal conveyor with a broad flat material carrying surface broader than said elevating conveyor, said horizontal conveyor cooperating with the elevating conveyor to receive root crop therefrom and permit the root crop to spread for inspection thereof and removal of debris and damaged crop, crop washing means on the frame receiving said root crop from said horizontal conveyor means and applying a spray of water onto the root crop, and means discharging the root crop from said washing means.

2. The root crop harvesting and processing machine as set forth in claim 1 wherein said crop washing means includes a source of water on the frame and supplying said spray of water for cleansing the root crop, and means collecting said spray of water and debris and dirt cleansed from the root crop and recirculating the water to said source.

References Cited by the Examiner
UNITED STATES PATENTS

| | | | |
|---|---|---|---|
| 2,179,868 | 11/1939 | Stebler | 134—68 |
| 2,397,959 | 4/1946 | Gephart | 134—171 |
| 2,706,878 | 4/1955 | Dahlman | 171—20 |
| 3,095,080 | 6/1963 | Wagner | 198—10 |

ABRAHAM G STONE, *Primary Examiner.*

ANTONIO F. GUIDA, *Examiner.*